(12) United States Patent
Tafoya

(10) Patent No.: US 7,581,699 B1
(45) Date of Patent: Sep. 1, 2009

(54) STEALTH ATTACK FIGHTER BOMBER

(76) Inventor: Samuel Barran Tafoya, 135-41st St. Cir., East, Bradenton, FL (US) 34208

( * ) Notice: Subject to any disclaimer, the term of this patent is extended or adjusted under 35 U.S.C. 154(b) by 405 days.

(21) Appl. No.: 11/732,250

(22) Filed: Apr. 3, 2007

(51) Int. Cl.
*B64C 1/00* (2006.01)
(52) U.S. Cl. ..................................... 244/119
(58) Field of Classification Search ......... 244/119–120, 244/35 R, 36, 47
See application file for complete search history.

(56) References Cited

U.S. PATENT DOCUMENTS

| | | | | | |
|---|---|---|---|---|---|
| 1,836,928 | A | * | 12/1931 | Mego | 244/5 |
| 1,862,102 | A | * | 6/1932 | Stout | 244/35 R |
| 1,977,843 | A | * | 10/1934 | Baume | 244/12.1 |
| 2,298,040 | A | * | 10/1942 | Davis | 244/35 R |
| D138,469 | S | * | 8/1944 | Eichman | D12/336 |
| 2,967,034 | A | * | 1/1961 | Eyre | 244/119 |
| 6,047,923 | A | * | 4/2000 | Lafferty | 244/15 |
| 6,053,453 | A | * | 4/2000 | Saiz | 244/36 |

* cited by examiner

*Primary Examiner*—Tien Dinh
(74) *Attorney, Agent, or Firm*—Dorothy S. Morse

(57) ABSTRACT

A fighter bomber aircraft having a rhomboid airframe with a dihedral bottom surface and a top surface designed as an airfoil. The rhomboid cross-sectional configuration gives it increased lift, stealth characteristics, and enhanced load-bearing capacity. It also has two central tubes stacked on top of one another and extending front-to-rear, with the upper tube extending part way through the airframe and preferably housing a pilot, guns forward from and in line with the pilot, a gear/equipment compartment behind the pilot, and fuel tanks positioned behind the gear/equipment compartment. The lower tube extends substantially throughout the airframe and preferably houses the air-intake for the engine, radar, nose gear, bombs, and rear engine. The aircraft has no conventional wing structure and its dihedral bottom surface allows it to make wheels-up emergency landings on water and hard runway surfaces. In addition, rockets can be optionally mounted on the top of the lift area.

20 Claims, 11 Drawing Sheets

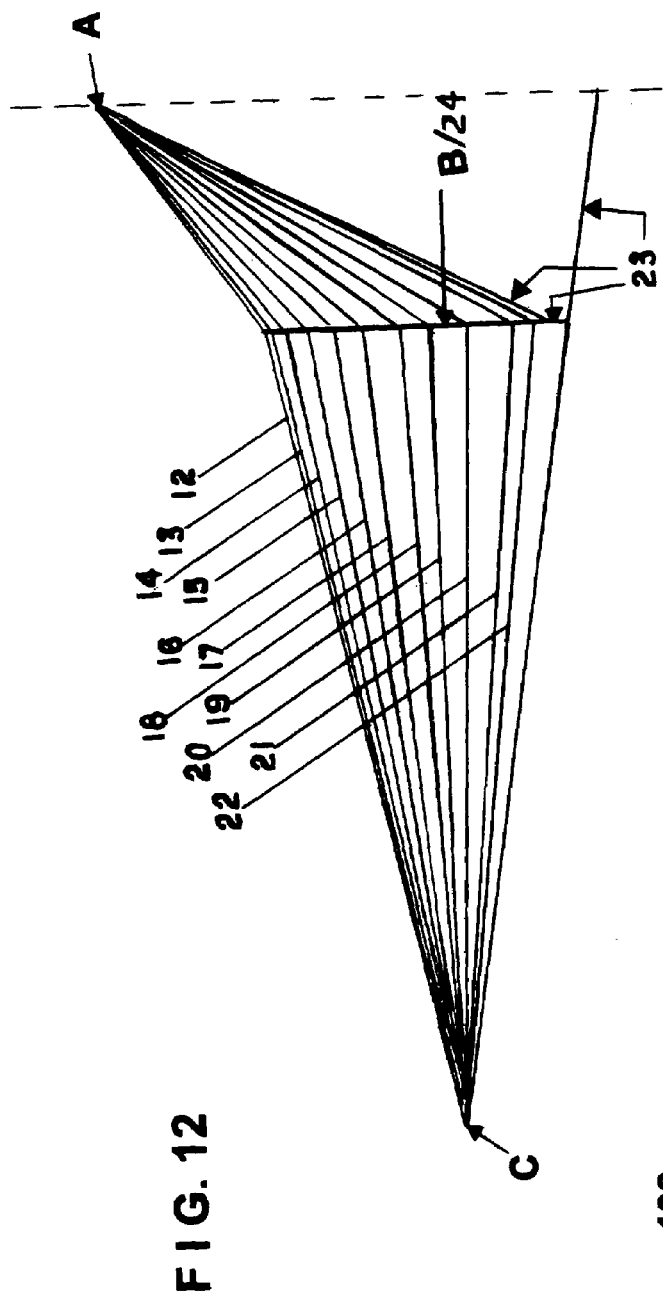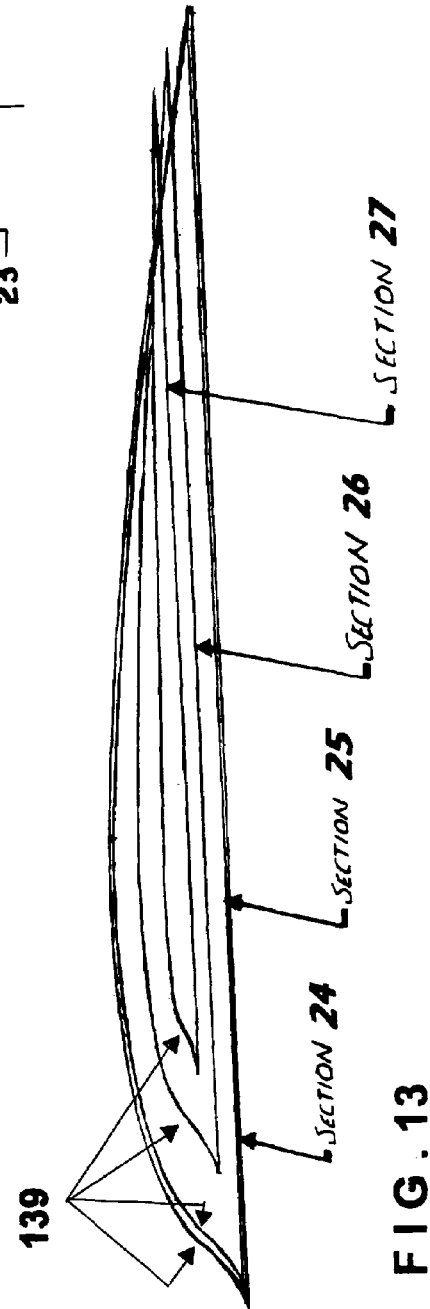
FIG. 12
FIG. 13

STEALTH ATTACK FIGHTER BOMBER

CROSS-REFERENCES TO RELATED APPLICATIONS

None.

BACKGROUND OF THE INVENTION

1. Field of the Invention

This invention relates to the field of motorized aircraft, specifically to an airframe that is strong, small, and compact and can be used as a fighter/bomber in military applications. It has a fuselage with a rhomboid cross-sectional configuration, which gives it increased strength, stealth characteristics, and enhanced load lifting capacity. It also has at least one rear engine, no conventional wing configuration, and an internal structure comprising two tubes stacked on top of one another which extend in a front-to-rear orientation. The tubular construction further provides a very strong backbone and contributes to the overall strength of the airframe. The upper tube extends approximately two-thirds of the length of the airframe and houses forward guns in-line with the pilot, most of the pilot's torso (with the pilot's head being positioned within a top-mounted canopy), a compartment for radio communication equipment and other gear behind the pilot, and two fuel tanks with one positioned rearward of the other, one providing fuel for outbound travel and the other providing fuel for return. In contrast, the lower tube extends substantially the full length of the airframe and houses radar equipment, the engine air intake, bomb storage area, and the jet engine(s). Further, the top surface of the present invention airframe is designed to be an airfoil and has an acceleration surface at line B-B that enhances lift for take-off and during flight, and the dihedral shape of the bottom surface of the airframe allows the pilot an option for a wheels-up emergency landing in the water or a wheels-up emergency landing on a hard runway surface. The dihedral bottom surface further does not reflect a radar beam back to the ground, giving the airframe stealth characteristics. In addition, rockets can be optionally mounted on the top of the lift area. It's compact and wingless configuration makes it easy to park at airports and on aircraft carriers. In addition, the engines are easily accessible for repair and replacement. Spoilers on the edge of the wings prevent vortex formation behind the airframe while in flight to allow planes to follow more closely behind one another. Although the retraction capability is not shown, the tail/skid wheel used for take-off could be optionally retracted in flight.

2. Description of the Related Art

Fighter aircraft continue to be required for military defense capability. The disadvantages of currently known fighter aircraft is that their wing structure prevents compact parking on aircraft carriers, they are not configured for optional wheels-up landing on a hard runway surface, they are not configured for optional wheels-up water landings, unreleased bombs attached under wings are a detriment to emergency landings, wing-mounted guns are not sighted to the pilot's eye, cockpit structure leaves the pilot vulnerable in combat, fuel storage in the wings is vulnerable to attack, extended wing structure inhibits maneuverability and the ability to perform a fast roll, and pilot visibility in a downward direction is restricted. Further, they do not have stealth characteristics and guns are generally mounted on the wings. In contrast, the present invention has a specific fuselage configuration that gives it increased strength and load lifting capacity, and provides enhanced downward visibility for the pilot. Since it has no conventional wing structure, storage and handling of the present invention on aircraft carriers is facilitated. Also, its dual tube structure and positioning thereof safeguards fuel tanks, protects the pilot, and makes both less vulnerable to attack. Further, emergency landings are facilitated by the dihedral bottom configuration of the present invention that creates a compressed atmosphere under the airframe, which permits wheels-up emergency landings on both water and hard runway surfaces. There is no aircraft known that has the same features and components as the present invention, nor all of its advantages.

BRIEF SUMMARY OF THE INVENTION

Objectives and Advantages

The primary object of this invention is to provide an aircraft with combined fighter/bomber capabilities which also has increased strength and load lifting capacity when compared to fighters and bombers in current use. It is also an object of this invention to provide an airframe that has stealth characteristics. A further object of this invention is to provide an airframe that is more easily handled and more compactly parked on aircraft carriers than currently existing fighter aircraft. It is also an object of this invention to provide an airframe that is simpler in structure and less expensive to manufacture, maintain, and repair than airframes currently used in modern fighter/bomber applications. A further object of this invention is to provide an airframe that gives pilots greater survivability during wheels-up emergency landings on hard runway surfaces and water. It is also an object of this invention to provide an airframe with bomb storage in a location that is safer for emergency landings with unreleased bombs than fighters and bombers in current use that typically carry such ordnance under the wings. It is a further object of this invention to provide an airframe that is more maneuverable than fighters and bombers in current use. A further object of this invention is to provide an airframe with added protection for the pilot and fuel storage areas. Finally, it is also an object of this invention to provide an airframe having guns in a position that allows easier and more accurate pilot use.

The present invention is designed with a rhombus or rhomboid shape that provides a strong, small, and compact airframe which is simpler in structure and less expensive to manufacture than airframes currently used in modern fighter/bomber applications. At the same time, the configuration also provides stealth characteristics, as well as increased lift and load lifting capacity over other fighter/bomber aircraft in current use. When viewing the most preferred embodiment of the present invention airframe from the top and front, Sections 1 through 5 at the front of the airframe appear identical in configuration, with two tubes each approximately four feet in diameter stacked on top of one another. The upper tube extends across Sections 1 through 14, while the lower tube extends the full length of the airframe (across Sections 1 through 23). The dual tubular construction provides a very strong backbone for the airframe of the present invention, and can be made from or reinforced with bulletproof or other materials that protect the pilot, fuel, navigation and communication equipment, and unreleased bombs. The upper tube houses the pilot, machine guns, fuel tanks, miscellaneous equipment including radio gear, and chafe, while the lower tube houses the air intake for the engine or engines, radar, nose wheel, and bomb load, with its rear portion housing or providing a mounting for one to three jet engines. Since bomb storage for the present invention is within the lower tube, unreleased bombs are in a safer location during emergency landings than when exposed bombs are carried under the wings of fighters and bombers, which is typical of fighters and bombers currently used for military applications. Although not limited thereto, the preferred width dimension of the present invention airframe is approximately eighteen feet and its preferred length dimension is approximately forty feet. Such dimensions, combined with the wingless configuration of the present invention airframe, make an airship that is easy to park and load on a conventional aircraft carrier or in an air park. It also permits a fuel capacity of approximately 2,500 gallons, with the option of using the winged portion of the fuselage, or the area designated for chafe, to expand fuel storage. Sections 6 through 12 show the rise of the top surface of the present invention which provides an acceleration surface and is configured to cause lift as an airfoil does during take-off and flight. Another view of the lifting effect for the present invention airframe is presented in Sections 24 through 27, which show the present invention having airfoils of common design, with the forward edge and top of each Section 24-27 displaying an accelerator ramp that speeds up the air flow over the top surface of the present invention airframe so as to reduce air pressure on the top surface, thereby increasing lift with less surface area. The rear of the airframe includes a progression of Sections 12 through 23, which shows the total top surface area thereof as providing lift for the present invention. The dihedral shape of the present invention's bottom surface causes a pressure differential under the airframe, and flaps at the bottom of the leading edge help to reduce this effect during landings. The flaps also break the ground effect when taking off. The dihedral shape of its bottom surface also gives the pilot an option to ditch the present invention fighter in water when needing to make an emergency landing, as well as to make a wheels-up emergency landing on a hard runway surface, since the dihedral bottom creates a compressed atmosphere under the airframe. In addition, the dihedral shape provides stealth characteristics for the present invention airframe. Further, the rudders of the present invention are tipped inward at the top for the pilot's convenience in holding altitude in a turn. The inboard rudder will depress the tail of the airframe to prevent a sliding downward action. Then, the outboard rudder raises the outboard side of the airframe to cause a banked turn. The landing gear has plenty of room to be raised, and a strong structural design. In addition, the wheel stance of the present invention is quite wide for landings on an aircraft carrier so that the rolling and pitch of the aircraft carrier does not affect the landings as much as those of currently used aircraft having a narrower wheel stance. Also, at the rear bottom (tail of the aircraft) there is a wheel for tail skid that also provides protection for the airframe when it lands or takes off at a great angle. Optionally, it may be retractable during flight. Further, since the machine guns placed in the upper tube are in front of the pilot, he has excellent aim, in contrast to the wing-mounted guns on currently used aircraft that require skill and experience to achieve an accurate shot. In addition to the armament in the upper tube, guns can be mounted elsewhere on the airframe as long as lift and maneuverability are not compromised. Spoilers optionally placed on the present invention lift structure (along the side and trailing edge of Line C) prevent vortex formation behind the airframe while in flight to allow multiple present invention airframes to follow more closely behind one another.

While the description herein provides preferred embodiments of the present invention airframe, it should not be used to limit its scope. For example, variations of the present invention, while not shown and described herein, can also be considered within the scope of the present invention, such as variations in the materials from which the components of the present invention can be made; the size and perimeter configuration of many of the present invention components; as well as the relative positioning of some present invention components. Thus, the scope of the present invention should be determined by the appended claims and their legal equivalents, rather than being limited to the examples given.

BRIEF DESCRIPTION OF THE SEVERAL
VIEWS OF THE DRAWINGS

FIG. 12 is an enlarged rear view, for additional clarity and reference, of the numbered cross-sections 12-23 previously shown in FIG. 11 on one side of the most preferred embodiment of the present invention.

FIG. 13 is a side view of the numbered longitudinal sections 24-27 in the most preferred embodiment of the present invention, previously shown in FIG. 10, which are now superimposed upon one another to illustrate airfoil design and reveal the preferred configuration of the accelerator ramp used to enhance lift.

LIST OF COMPONENTS

Figure 1:
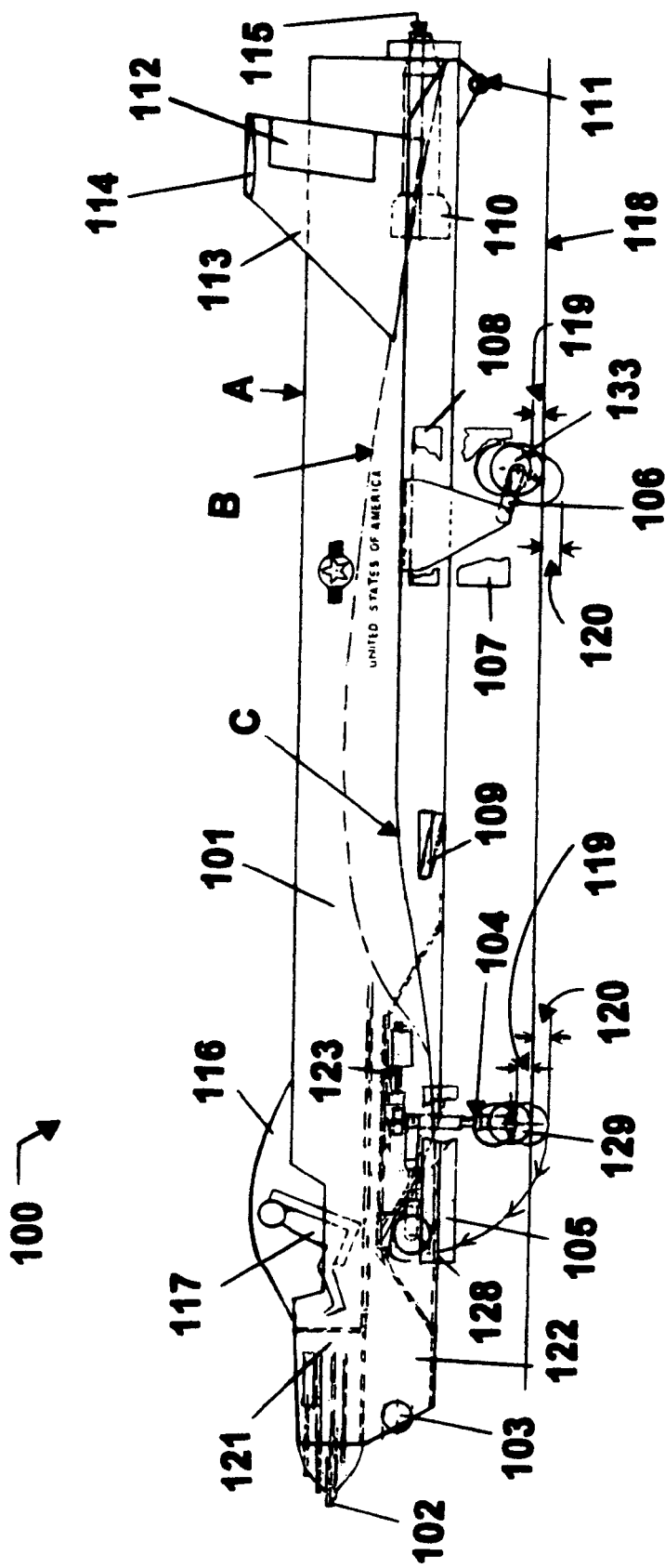
FIG. 1 is a side view of the most preferred embodiment of the present invention.

100—Most preferred embodiment of the invention
101—Airframe
102—Guns/Armament
103—Radar
104—Nose landing gear
105—Nose gear cover
106—Main landing gear
107—Inboard main landing gear cover/faring 108—Outboard main landing gear cover/faring
109—Flaps
110—Jet engine
111—Tail wheel (skid)
112—Rudder
113—Vertical stabilizer (2)
114—Elevator
115—Jet Discharge (exhaust gas)
116—Canopy
117—Pilot
118—Water line
119—Jounce
120—Rebound
121—Upper tube
122—Lower tube
123—Hydraulic steering cylinder
124—Auxiliary main landing gear cover/faring
125—Bomb bay door
126—(not used)
127—Optional engines
128—Nose wheel in raised position
129—Nose wheel in down position
130—Main wheel in raised position
131—Site glass—for instrument image projection
132—Control surfaces (ailerons)
133—Main wheel in down position
134—Lift cylinder for main gear
135—Total top surface of airfoil (shown in sections 6-23)
136—Total bottom surface of dihedral (shown in sections 6-23)
137—Bomb storage area
138—Rear end of upper tube
139—Accelerator profile (provides air acceleration over the top of the airframe's airfoil section)
140—Storage area (for flotation gear and chafe)
141—Forward fuel tank
142—Aft fuel tank
143—Gear storage area
A—Top line of airframe in side view, or centerline of airframe in plan view
B—Break line of airframe (same as section line 24)
C—Side/Perimeter edge of airframe

DETAILED DESCRIPTION OF THE INVENTION

FIGS. 1-13 show the most preferred embodiment 100 of an aircraft with stealth characteristics, as well as increased lift and load lifting capacity over other fighter/bomber aircraft in current use. Its airframe 101 has a rhombus or rhomboid shape (seen in FIGS. 4 and 10 that provides a strong, small, and compact construction which is simpler in structure and less expensive to manufacture than airframes currently used in modern fighter/bomber applications. Two tubes 121 and 122 (shown in FIG. 8) are stacked vertically on top of one another, with each preferably being approximately four feet in diameter. Upper tube 121 extends across Sections 1 through 14, while lower tube 122 extends the full length of airframe 101 (across Sections 1 through 23). Tubes 121 and 122 provide a very strong backbone and contribute to the overall strength of most preferred embodiment 100. Further, upper tube 121 preferably houses a pilot 117, machine guns 102, forward and aft fuel tanks 141 and 142 respectively for approaching a target and return, a storage area 143 behind pilot 117 for miscellaneous equipment including radio gear, and a storage area 140 for chafe, while lower tube 122 preferably houses the air intake (not given a numerical designation) for the engine or engines 110, radar 103, nose wheel 129, and bomb storage area 137, with the rear portion of lower tube 122 housing or providing a mounting for one to three jet engines (marked as a main engine 110 in FIGS. 1, 3, 5, and 8 and the two optional engines 127 in FIG. 5). Although not limited thereto, the preferred width dimension of the present invention airframe is approximately eighteen feet and its preferred length dimension is approximately forty feet, dimensions which make it easy to park and load on a conventional aircraft carrier. Such dimensions also permit a minimum fuel capacity of approximately 2,444 gallons, with the option of using the storage area 140 designated for chafe to expand fuel storage. In the accompanying illustrations, the total top surface of airfoil (shown in sections 6-23) provides lift and is designated by the number 135 in FIG. 6, while the total bottom surface of dihedral (shown in sections 6-23), which provides compression upon landing is designated by the number 136 in FIG. 11. Sections 6 through 12 (as visible in FIG. 9) show the differential of the front portion of top surface 135 (also identified in the accompanying illustrations as point A) of most preferred embodiment 100 which is configured to cause lift as an airfoil does. Another view of the lifting effect for the rhomboid present invention airframe 101 is presented in Sections 24 through 27 (shown in FIG. 13), which show multiple airfoils of common design, with the forward edge and top of each Section 24-27 displaying an accelerator ramp 139 that speeds up the air flow over the top surface 135 of most preferred embodiment 100 so as to reduce air pressure on top surface 135, thereby increasing lift with less surface area. The rear of airframe 101 includes a progression of Sections 12 through 23, which shows the rear portion of top surface area 135 which also provides lift for the present invention. By not using a conventional wing configuration to provide lift, the heavy wing box found in prior art aircraft is eliminated, and the upward wing deflection experienced by conventional aircraft under load is also eliminated. The dihedral shape of the present invention bottom surface 136 (shown in FIGS. 4, 7, and 10) causes a pressure differential under airframe 101, and flaps 109 at the bottom of the leading edge lift the nose of airframe 101 to overcome the pressure differential for control of landing speed. Flaps 109 also break the ground effect when taking off. Pilot 117 further has an option to ditch most preferred embodiment 100 in water when needing to make an emergency landing, as well as to make a wheels-up emergency landing on a hard runway surface, facilitated by the dihedral shape of its bottom surface 136 creating a compressed atmosphere under airframe 101. Further, the rudders 112 of most preferred embodiment 100 are tipped inward at the top for the convenience of pilot 117 in holding altitude in a turn. The inboard rudder 112 will depress the rear portion (tail) of airframe 101 to prevent a sliding downward action. Then, the outboard rudder 112 raises the outboard side of airframe 101 to cause a banked turn. The landing gears 104 and 106 have plenty of room to be raised, and a strong structural design. In addition, the wheel stance or spaced-apart distance between the two main landing gears 106 is quite wide for landings on an aircraft carrier (not shown) so that the rolling and pitch of the aircraft carrier does not affect the landings as much as those of currently used aircraft (not shown) having a narrower wheel stance. Also, at the rear bottom (tail of the aircraft) there is a tail wheel 111 for tail skid that also provides protection for airframe 101 from structural damage when it lands or takes off at a great angle. Although tail wheel 111 may be retractable, a non-retractable configuration is preferred. Further, since the machine guns 102 placed in upper tube 121 are positioned directly in front of pilot 117, they provide excellent aim for pilot 117, in contrast to the wing-mounted guns on currently used aircraft that require skill and experience to achieve an accurate shot. In addition to the armament/machine guns 102 located in upper tube 121, additional guns (not shown) can be mounted elsewhere on airframe 101 as long as lift and maneuverability are not compromised.

Figure 2:
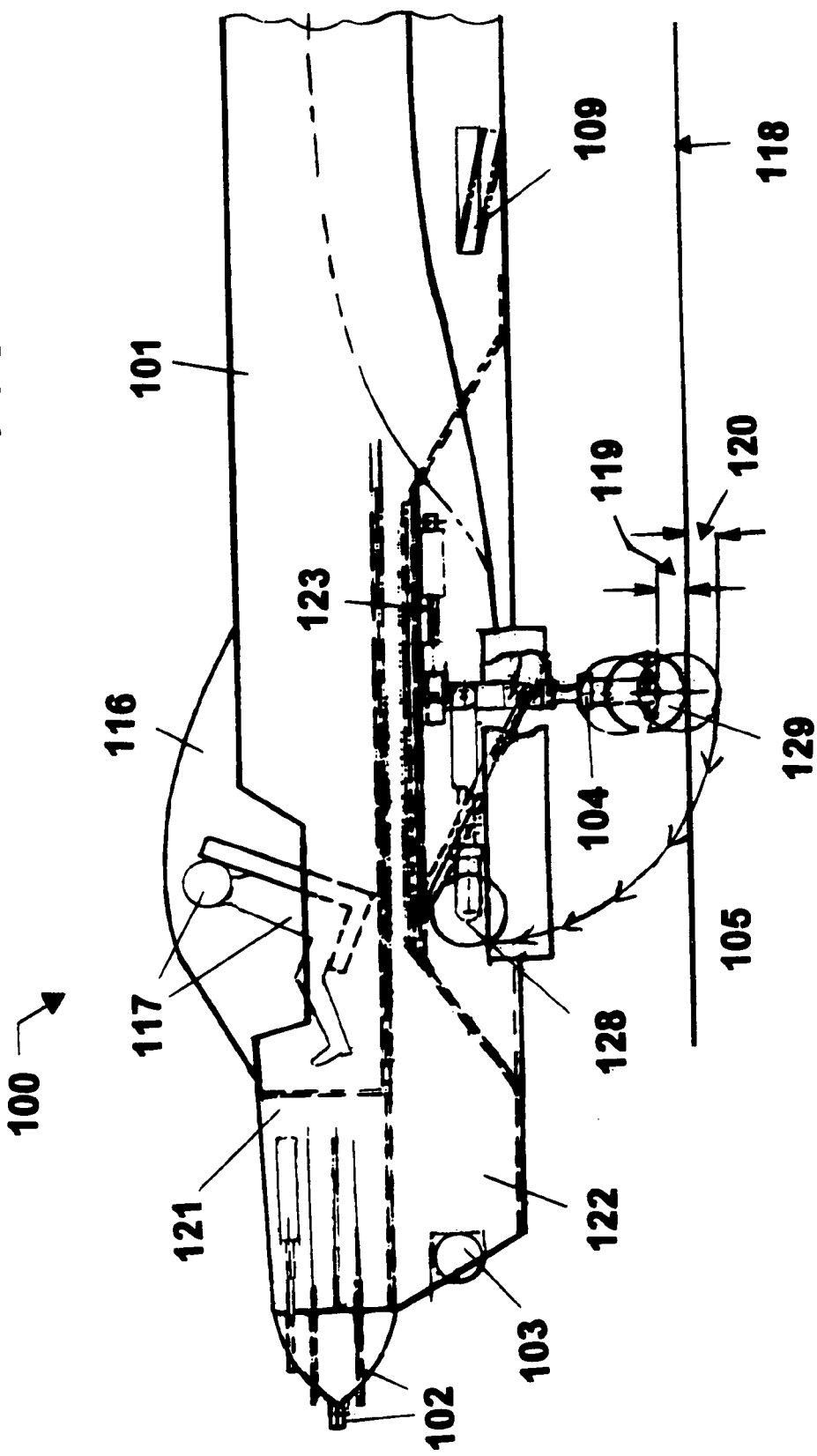
FIG. 2 is an enlarged side view of the front portion of the most preferred embodiment of the present invention shown in FIG. 1.
Figure 3:
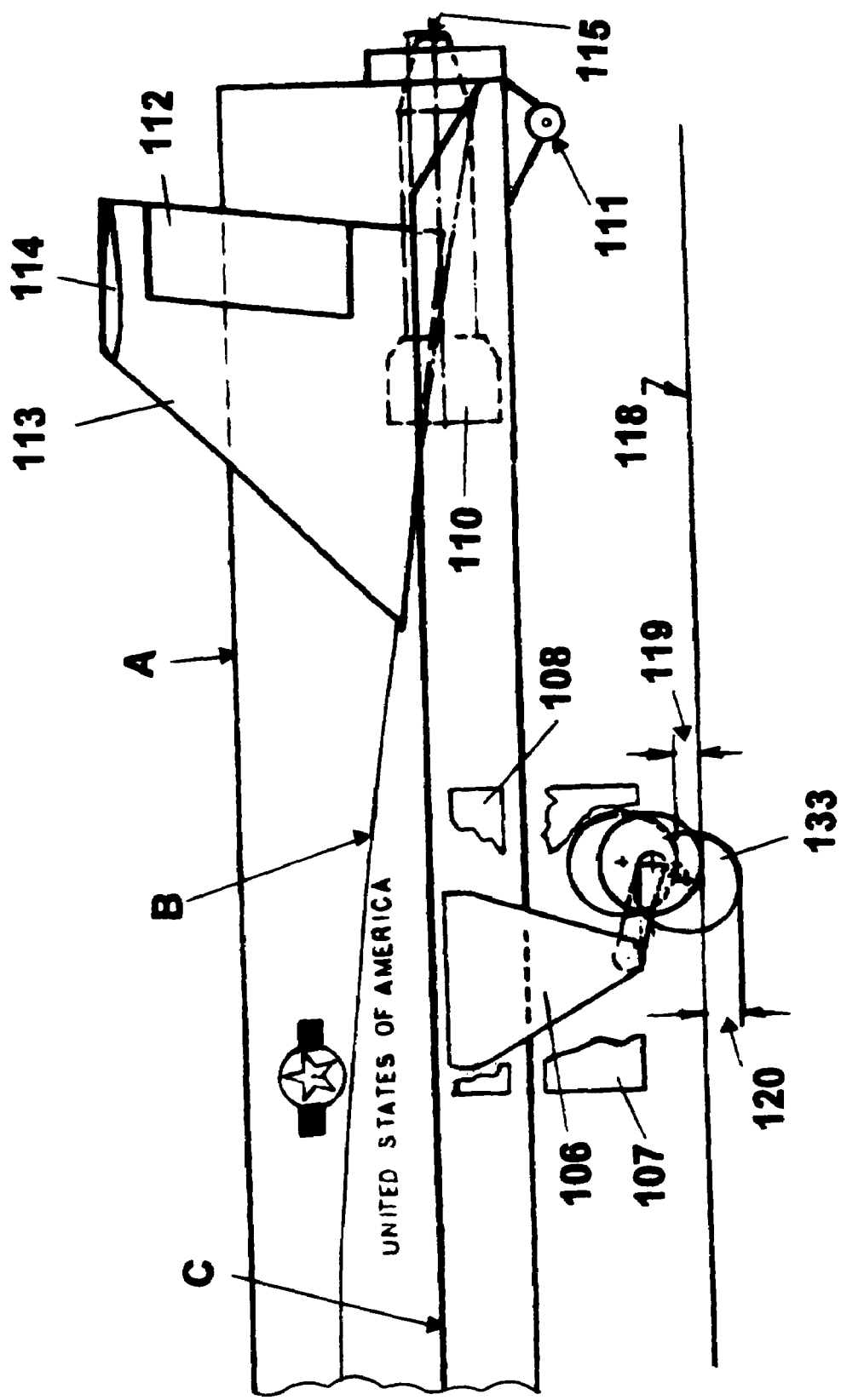
FIG. 3 is an enlarged side view of the rear portion of the most preferred embodiment of the present invention shown in FIG. 1.

FIGS. 1-3 show a side view of the airframe 101 of the most preferred embodiment 100 of the present invention. FIGS. 2 and 3 are enlarged views respectively of the front and rear portions of the most preferred embodiment 100 shown in FIG. 1, provided for clarity of illustration. Two tubes 121 and 122, each approximately four feet in diameter, are stacked vertically on top of one another, with upper tube 121 extending approximately two-thirds of the length of airframe 101 and lower tube 122 extending substantially the full length of airframe 101. FIGS. 1 and 2 show upper tube 121 housing armament/machine guns 102 and pilot 117, with a canopy 116 above upper tube 121 vertically extending the space provided for accommodating pilot 117. FIGS. 1 and 2 further show lower tube 122 housing radar 103, nose gear 104, and the nose wheel (designated by the number 128 when in a raised position), while FIGS. 2 and 3 show lower tube 122 housing jet engine 110. Although not shown in FIGS. 1-3 (but visible in FIG. 8), the upper tube 121 in preferred embodiment 100 also houses forward and aft fuel tanks 141 and 142, a storage area 143 behind pilot 117 for miscellaneous equipment including radio gear, and a rear storage area 140 for chafe or extra fuel, with lower tube 122 also housing bomb storage area 137. Although not visible in FIGS. 1-3 and not given a numerical designation, it is also contemplated for lower tube 122 to house the air intake for main engine 110 or main engine 110 and optimal engines 127 where multiple engines are incorporated into the design of airframe 101. Tubes 121 and 122 can be made from, or reinforced with, spun carbon fiber, Kevlar, rolled aluminum, or other lightweight/bulletproof materials and or combination thereof to further protect pilot 117, forward and aft fuel tanks 141 and 142, as well as radio gear in storage area 143, radar 103, and other operational/navigation equipment (not shown). In addition, FIGS. 1 and 2 show flaps 109 movable between an uppermost position and a downwardly extending position, with the downwardly positioning of flaps 109 representing a position that would break the pressure differential ground effect under airframe 101 during take offs and landings, and FIGS. 2 and 3 show the preferred positioning of tail wheel 111, the preferred positioning of one of the two vertical stabilizers 113 and its rudder 112 relative to airframe 101 and elevator 114, the preferred positioning of jet discharge 115 for main engine 110 at the rear of airframe 101, and lines A, B, and C which respectively represent the top of the center line of airframe 101, the break line of airframe 101 (also Section 24 in FIG. 13), and the side/perimeter edge of airframe 101. Optionally, although not shown, tail wheel 111 can be made so that it can be retracted during flight, however, non-retracted positioning is preferred. Additionally, FIGS. 1 and 2 show nose landing gear 104 in raised and lowered positions, the nose wheel associated with nose landing gear 104 (identified by the number 128 in a raised position and the number 129 in a lowered position), as well as in positions showing jounce 119 and rebound 120 for nose wheel 129 in the lowered position. Hydraulic steering cylinder 123 and nose gear cover 105 are also shown in FIGS. 1 and 2. Similarly, one of the two laterally spaced-apart main landing gears 106 is shown in FIGS. 1 and 3 aft of nose landing gear 104. The wheel associated with main landing gear 106 (having the numerical designation of 133 in its lowered position and the numerical designation of 130 in a raised position) is also shown in FIGS. 1 and 3 in positions of jounce 119 and rebound 120. Two parts of a three-part cover structure for main landing gears 106 are shown in FIGS. 1 and 3, to include inboard main landing gear cover or faring 107 and outboard main landing gear cover or faring 108. Auxiliary main landing gear cover or faring 124 is not shown in FIG. 1 or 3, but is visible in FIGS. 4-7 and 10. The water line of most preferred embodiment 100 is also marked in FIGS. 1-3 with the numerical designation of 118.

Figure 4:
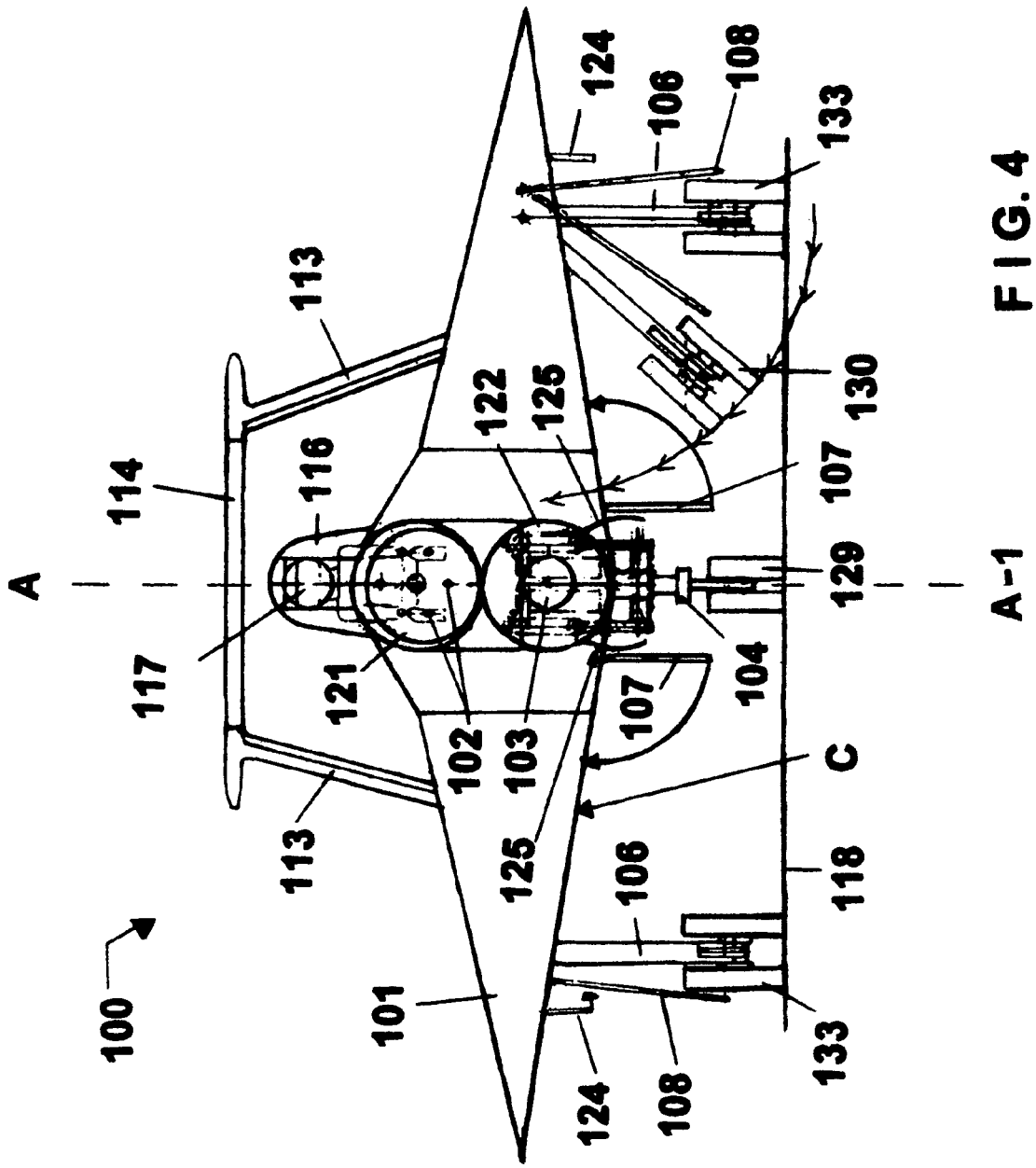
FIG. 4 is a front end view of the most preferred embodiment of the present invention.
Figure 5:
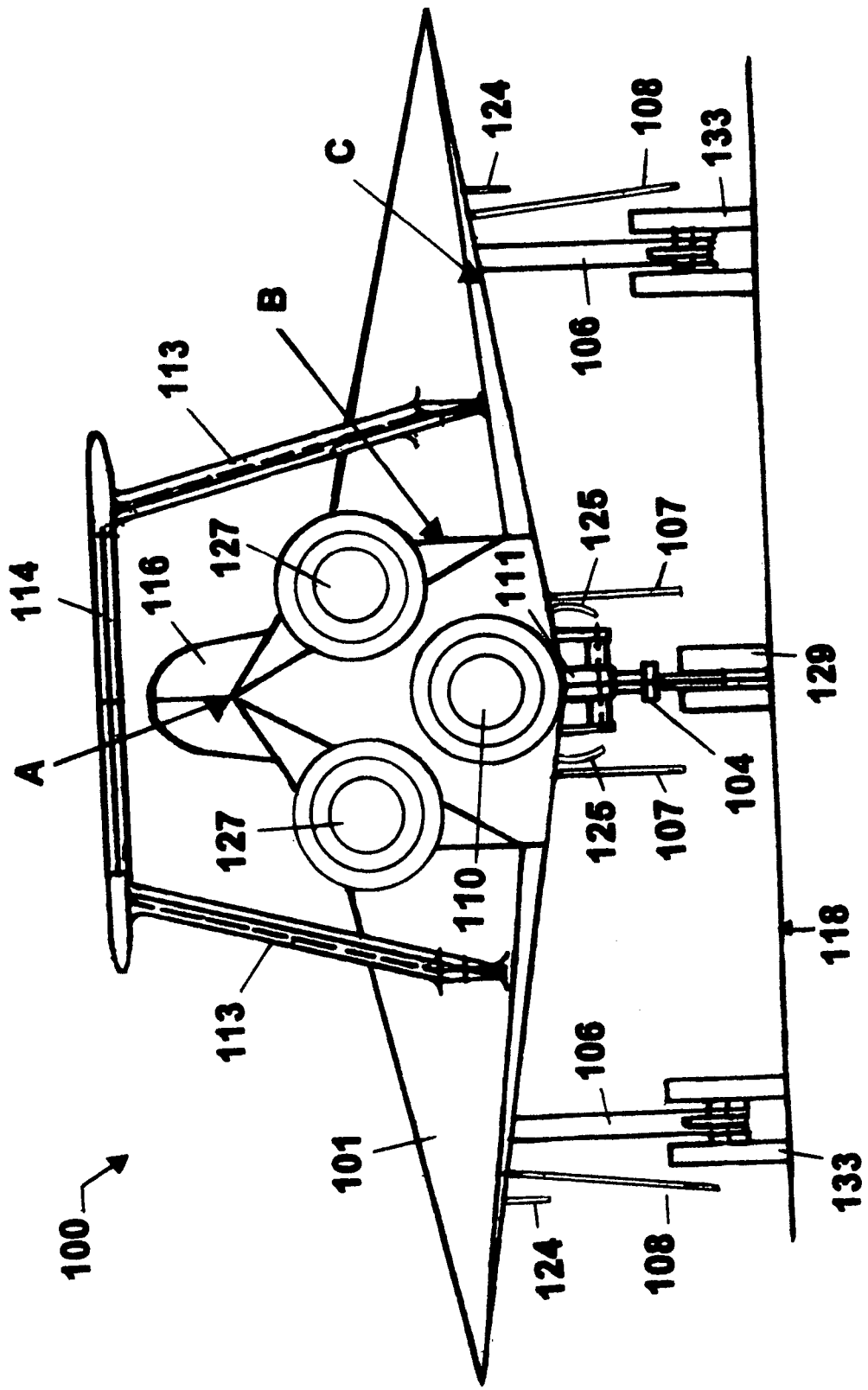
FIG. 5 is a rear end view of the most preferred embodiment of the present invention

FIGS. 4 and 5 show the rhomboid shape of most preferred embodiment 100 respectively via front end and rear end views. In the central portion of most preferred embodiment 100 and as viewed from its front end, FIG. 4 shows upper tube 121 vertically stacked above lower tube 122, with pilot 117 housed within upper tube 121 and canopy 116. Armament/machine guns 102 are also shown in FIG. 4 in front of and aligned with pilot 117. In addition, FIG. 4 also shows radar 103 centrally positioned within lower tube 122. Central positioning of radar 103 is not critical. In contrast and as viewed from the rear, FIG. 5 shows the central portion of most preferred embodiment 100 having a main engine 110 and two optional engines 127 positioned above and offset laterally from main engine 110 in symmetrical arrangement relative to main engine 110. Centrally above main engine 110 and optional engine 127, FIG. 5 shows canopy 116. FIG. 5 also shows tail wheel 111 positioned centrally below main engine 110 and behind nose landing gear 104. FIGS. 4 and 5 both show the preferred positioning of the two vertical stabilizers 113 and elevator 114 relative to airframe 101, main engine 110, and optional engines 127. FIGS. 4 and 5 also show line C which represents the side/perimeter edge of airframe 101, with FIG. 5 further showing lines A and B which respectively represent the top of the center line A/A-1 of airframe 101 and the break line of airframe 101 (also Section 24 in FIG. 13). Additionally, FIGS. 4 and 5 both show nose landing gear 104 in a lowered position, nose wheel 129, and bomb bay doors 125, however nose gear cover 105 is not shown in FIGS. 4 and 5. Similarly, FIGS. 4 and 5 show the two laterally spaced-apart main landing gears 106, main wheels 133, and all three parts of the three-part cover structure for each main landing gear 106, to include inboard main landing gear cover or faring 107, outboard main landing gear cover or faring 108, and auxiliary main landing gear cover or faring 124. FIG. 4 further shows the starboard main landing gear 106 and raised main wheel 130 in a partially raised position extending toward inboard main landing gear cover or faring 107. The water line of most preferred embodiment 100 is also marked in FIGS. 4 and 5 with the numerical designation of 118.

Figure 6:
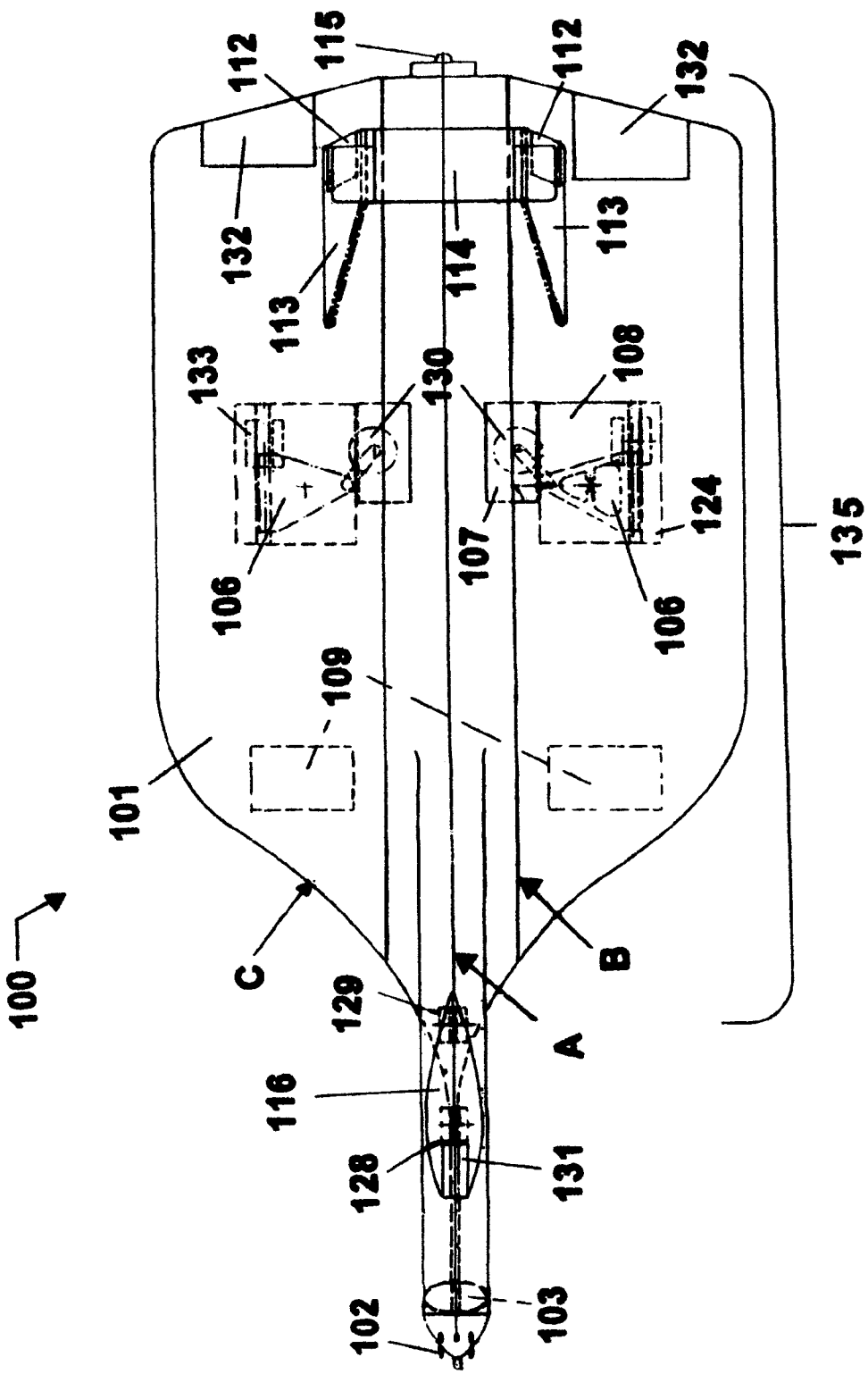
FIG. 6 is a top view of the most preferred embodiment of the present invention with more structural detail being visible in the port main landing gear and the starboard main landing gear being shown via a more general representation.

FIG. 6 shows a top view of the most preferred embodiment 100 of the present invention. An exposed portion of armament/machine guns 102 is shown extending beyond the forward end of upper tube 121, with radar 103 positioned beneath armament/machine guns 102 in lower tube 122. The positioning of radar 103 relative to armament/machine guns 102 is not critical. Rearward from armament/machine guns 102 and radar 103, FIG. 6 shows canopy 116 having a site glass 131 on its forward-facing portion that can be used for the convenience of a pilot 117 sitting within upper tube 121 and canopy 116 for instrument image projection. Beneath canopy 116, FIG. 6 also shows the raised nose wheel housed within lower tube 122 and the same nose wheel in a lowered position, respectively marked by the numbers 128 and 129. Rearward from canopy 116, FIG. 6 shows flaps 109 laterally on both sides of airframe 101, with two laterally spaced-apart main landing gears 106 positioned rearward from flaps 109. Similar to its depiction of raised and lowered nose wheels 128 and 129, FIG. 6 also shows the wheels for the two main landing gears 106 in raised and lowered positions, marked respectively by the numbers 130 and 133. The starboard main landing gear 106 is illustrated with detailed structure not provided for the port main landing gear 106. Although such detailed structure shown is preferred for both main landing gears 106, it is not critical. Rearward from main landing gears 106, FIG. 6 shows the two spaced-apart vertical stabilizers 113, the elevator 114 connected between the upper ends of vertical stabilizers 113, the rudder 112 on the rear portion of each vertical stabilizer 113, and the centrally positioned jet discharge/exhaust gas port 115 for main engine 110. The elevator 114 is optional and may be omitted for stealth purposes. Should one or more optional engines 127 be used in addition to main engine 110, a jet discharge/exhaust gas port 115 would also be shown for each optional engine 127. Further, positioned laterally to and slightly rearward from each vertical stabilizer 113, FIG. 6 shows a control surface or aileron 132. Lines A, B, and C are also illustrated in FIG. 6, which respectively represent the top of the center line (A/A-1 in FIG. 4) of airframe 101, the break line of airframe 101 (also Section 24 in FIG. 13), and the side/perimeter edge of airframe 101. The bracket line indicated by the number 135 represents the total top airfoil surface of airframe 101 from Sections 6-23, as indicated in FIGS. 8 and 9.

Figure 7:
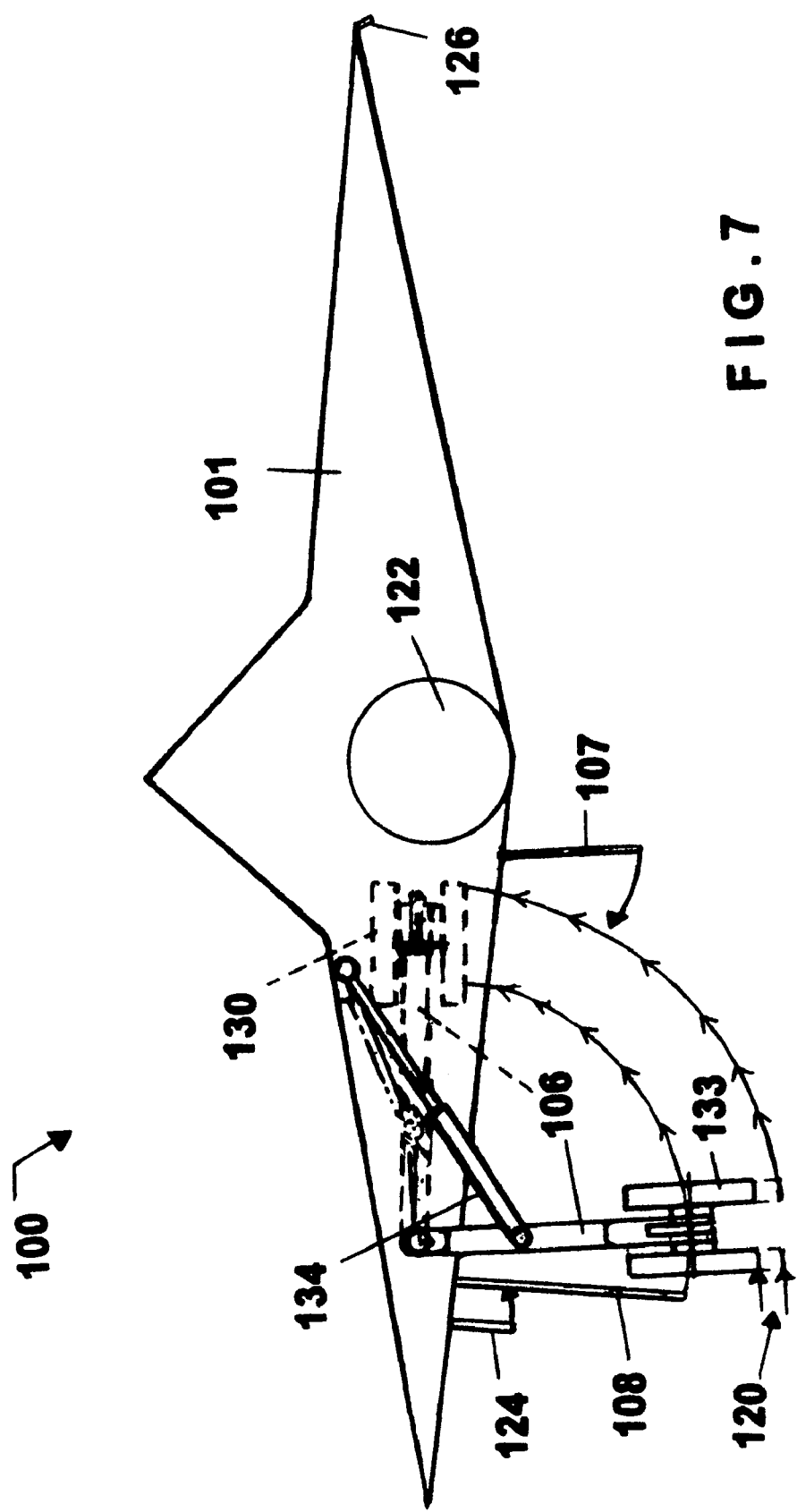
FIG. 7 is a sectioned view of the most preferred embodiment of the present invention identified as Section 16 in FIGS. 8 and 9 and showing the connection and rotation of one landing gear between fully extended and stored positions on one side of the lower tube, and further showing the three door farings used for each main landing gear.
Figure 8:
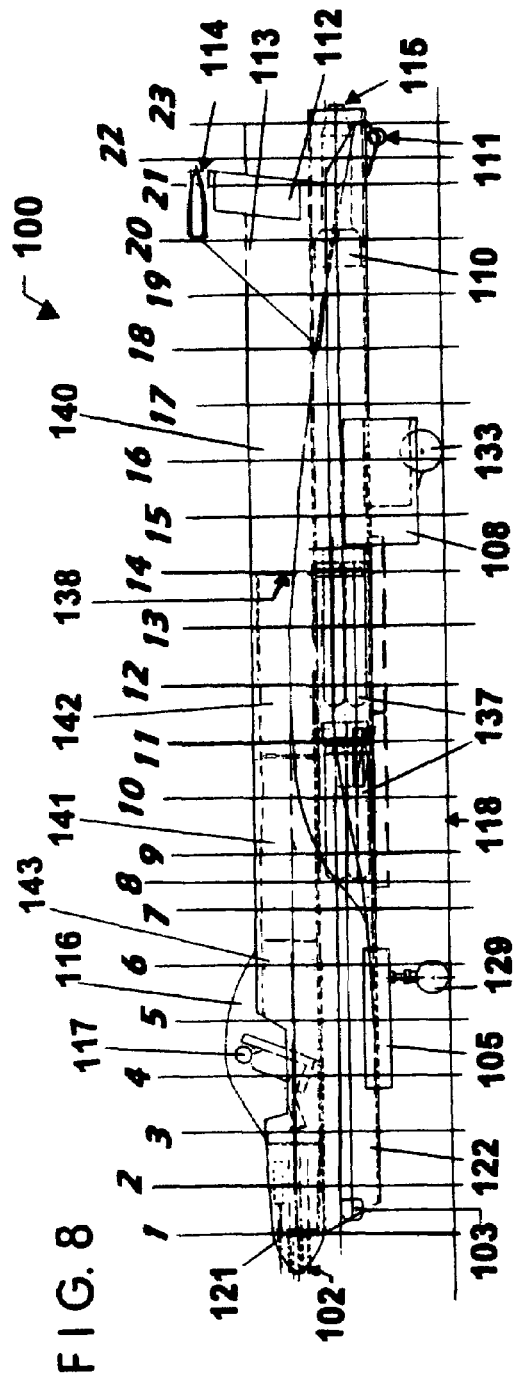
FIG. 8 is a side view of the most preferred embodiment of the present invention with cross-sections marked using ascending numbers 1-23 from front to rear.
Figure 9:
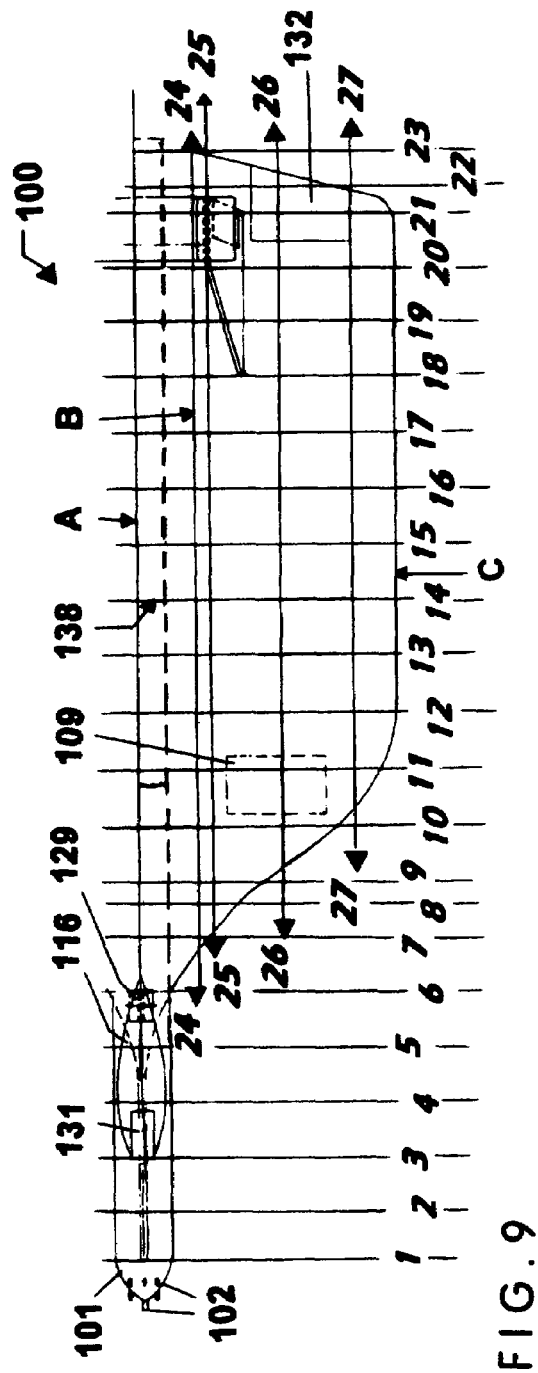
FIG. 9 is a top view of the most preferred embodiment of the present invention with cross-sections 1-23 marked front to rear, and cross-sections 24-27 marked from center line to side.

FIG. 7 shows a rear view of Section 16 in the most preferred embodiment of the present invention (also shown in FIGS. 8 and 9). FIG. 7 shows the connection and rotation of one main landing gear 106 between fully extended and stored positions on one side of the lower tube 122. For clarity of illustration, only the main landing gear 106 on the port side of airframe 101 is depicted, however it is contemplated for the other main landing gear 106 to be configured and positioned similarly. The port main landing gear 106 is shown in two different positions, lowered and raised. The lower tube 122 is also illustrated for reference. FIG. 7 shows main landing gear 106 in a lowered/extended position with lowered main wheel being marked with the number 133. In addition, the rebound 120 for lowered main wheel 133 is also illustrated. Main landing gear 106 is also shown pivoted into its raised/stored position, with raised main wheel being given the numerical designation of 130. The lift cylinder 134 for main landing gear 106 is also illustrated. The three-part cover used for main landing gear 106 are also depicted in FIG. 7, including inboard main landing gear cover/faring 107, outboard main landing gear cover/faring 108, and auxiliary main landing gear cover/faring 124. FIG. 7 also shows an optional spoiler 126 in section on the side edge of the present invention lift structure that is configured to prevent vortex formation behind the airframe 101 while in flight and allow multiple present invention airframes 101 to follow more closely behind one another. Spoilers 126 can also optionally be placed along the trailing edge of Line C.

FIGS. 8 and 9 show selected components and features of most preferred embodiment 100 and its Sections 1 through 27. FIG. 8 shows a side view of the most preferred embodiment of the present invention with Sections 1 through 23 marked using ascending numbers from front to rear. FIG. 9 is a top view of the port side of most preferred embodiment 100. While FIG. 9 also shows Sections 1 through 23, it further shows Sections 24 through 27. FIGS. 8 and 9 are positioned on the drawing sheet so as to substantially align the Section lines 1 through 23 for a more thorough identification of the positioning of components and features of most preferred embodiment 100. When viewed from the top (see FIG. 9) and front (see FIGS. 4 and 10 for a front view of airframe 101), Sections 1-5 at the front of preferred embodiment 100 appear substantially identical in configuration and dimension. FIGS. 8 and 9 both show machine guns/armament 102 at the front of preferred embodiment 100 and in upper tube 121, extending substantially through Sections 1-3. In addition, FIG. 8 shows radar 103 below machine guns/armament 102 in lower tube 122, and positioned between Section lines 2 and 3. Rearward from machine guns/armament 102, FIGS. 8 and 9 further show canopy 116 secured to the upper portion of upper tube 121 and substantially positioned between Section lines 3 and 6. FIG. 9 shows the site glass 131 in the front-facing portion of canopy 116 positioned between Section lines 3 and 4, while FIG. 8 shows pilot 117 substantially positioned within canopy 116 and upper tube 121 between Section lines 3 and 5. Immediately below canopy 116 in the portion of upper tube 121 behind pilot 117, FIG. 8 shows gear storage area 143 extending from Section line 5 to a location part way between Section lines 6 and 7. FIG. 8 further shows forward fuel tank 141 and aft fuel tank 142 in upper tube 121 behind gear storage area 143, with forward fuel storage tank 141 extending between Section lines 6 and 11, aft fuel storage tank 142 extending between Section lines 10 and 14, and the rear end of upper tube 121 being given the numeral designation of 138 approximately at Section line 14. The rear end 138 of upper tube 121 is also marked in FIG. 9 at Section line 14. Behind the rear end of upper tube 121, FIG. 8 shows a storage area 140 for chafe and floatation gear and/or extra fuel (not shown). Below the rear portion of canopy 116 and below lower tube 122 in a position close to Section line 6, FIGS. 8 and 9 both show nose wheel 129 in its down position, with FIG. 8 also showing nose gear cover 105 extending substantially between Section lines 4 and 6. In addition, FIG. 9 shows flap 109 centrally positioned in airframe 101, extending longitudinally between Section lines 10 and 12, as well as laterally between Section lines 25 and 27. FIG. 8 further shows bomb storage area 137 positioned centrally within airframe 101 between Section lines 8 and 15. Bomb storage area 137 is also positioned within lower tube 122 rearward from nose wheel 129. Upper tube 121 and lower tube 122 may include bulletproof material for added protection of pilot 117 and bomb storage area 137. Thus, since bomb storage area 137 is within lower tube 122, unreleased bombs (not shown) in preferred embodiment 100 are in a safer location during emergency landings than exposed bombs carried under the wings of fighters, which is typical of fighters currently used in military applications. FIG. 8 further shows outboard main landing gear cover/faring 108 and main wheel 133 in a down position located between Section lines 14 and 17. Additionally, FIGS. 8 and 9 both show rudder 112 located substantially between Section lines 20 and 22, vertical stabilizer 113 located substantially between Section lines 18 and 22, and elevator 114 located substantially between Section lines 20 and 22, while FIG. 9 also shows control surface/aileron 132 located between Section lines 20 and 23. Rearward from rudder 112, FIG. 8 shows tail wheel 111 located between Section lines 22 and 23, and jet discharge 115 for main engine 110 located rearward from Section line 23 and in line with lower tube 122. Further, FIG. 8 uses water line 118 as a reference line under Sections 1-23, while FIG. 9 displays the alphabetical designations of A, B, and C, which respectively identify the centerline of the top surface of airframe 101 and extends substantially from Section line 1 to Section line 23, the break line (the same line marked with the designation of Section line 24) of airframe 101 where rocket mounting is contemplated which extends substantially from Section line 5 to Section line 23, and the side/perimeter edge of airframe 101 which extends substantially from Section line 5 to Section line 23. Section lines 24-27 in FIG. 9 are shown approximately parallel to one another and extending longitudinally relative to airframe 101, with Section line 24 being the closest in location to centerline A and Section 27 being the closest in location to the side/perimeter edge C of airframe 101.

Figure 10:
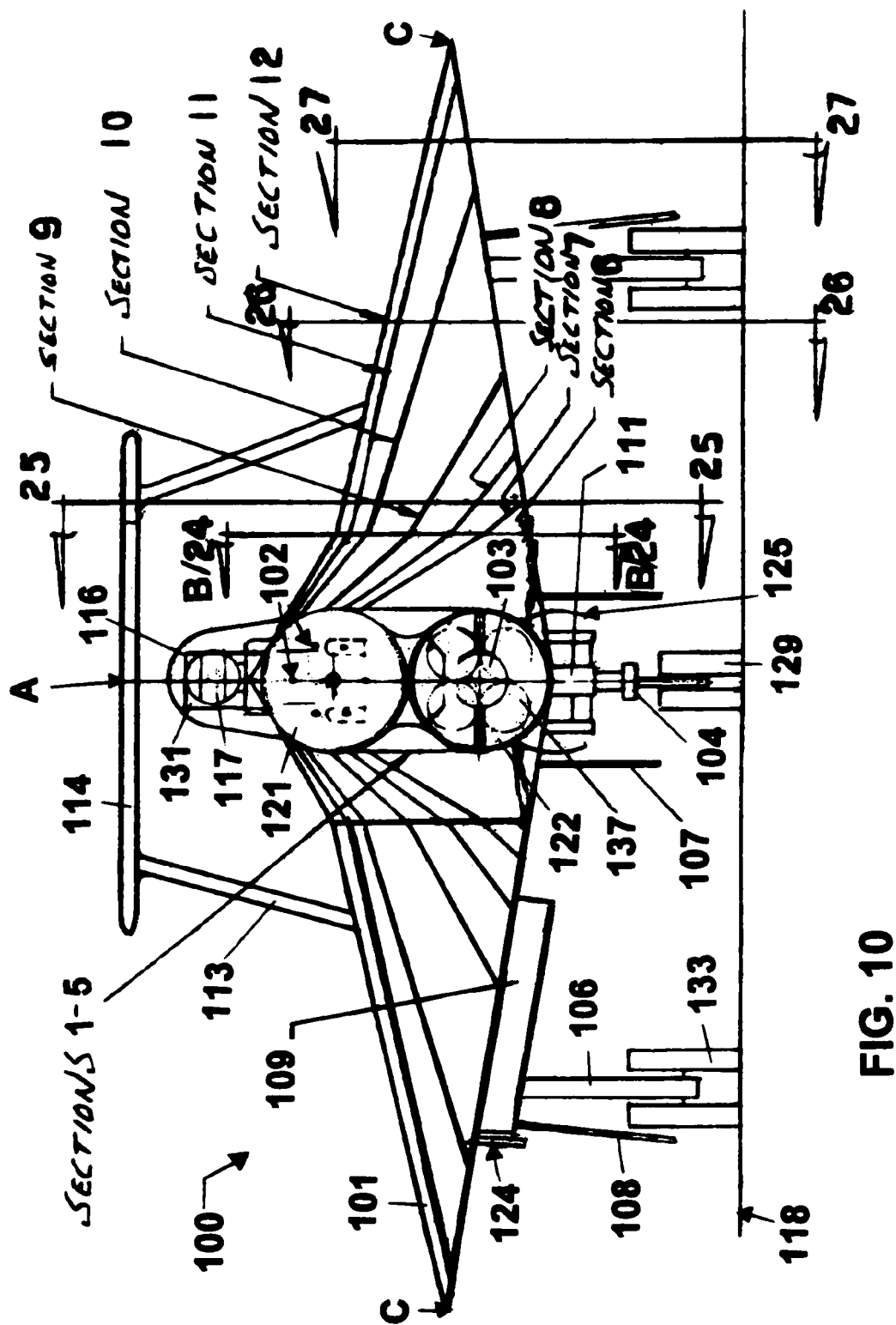
FIG. 10 is a front end view of the most preferred embodiment of the present invention with landing gears down and cross-sections 1-12 and 24-27 marked with their numerical designations.

FIG. 10 shows some of the same Section lines used for reference in FIGS. 8 and 9 in a front view of most preferred embodiment 100. The Section lines shown in FIG. 10 include Section lines 1-12 and Section lines 24-27. Upper tube 121 and lower tube 122 have substantially the same diameter dimension and are stacked upon one another centrally within airframe 101. A canopy 116 is attached over the top portion of upper tube 121, which together house pilot 117. Rectangular appearing site glass 131 is located directly in front of pilot 117 on the front-facing portion of canopy 116. FIG. 10 also shows machine guns/armament 102 located within upper tube 121 and radar 103 positioned centrally within lower tube 122, with bomb storage area 137 also visible within lower tube 122 behind radar 103. Since Sections 1-5 are substantially identical in configuration and dimension to give pilot 117 increased downward visibility, a single line is positioned laterally to upper tube 121 and lower tube 122 and marked as representing Sections 1-5. FIG. 10 also shows Section lines 6-12 with landing gears down and numbered cross-sections 24-27. Water line 118 is also marked relative to airframe 101. FIG. 10 further shows the rhomboid shape of most preferred embodiment 100, and the preferred positioning of the two vertical stabilizers 113 and elevator 114 relative to airframe 101. As mentioned before, elevator 114 is preferably removed for stealth purposes. In addition, FIG. 10 show lines A, B, and C, with C representing the side/perimeter edge of airframe 101, and lines A and B which respectively representing the center line A/A-1 (shown in FIG. 4) of airframe 101 and the break line of airframe 101 (also Section 24 in FIG. 13). Further, FIG. 10 shows nose landing gear 104 in a lowered position, lowered nose wheel 129, and bomb bay doors 125, however nose gear cover 105 is not shown in FIG. 10. Similarly, FIG. 10 shows the two laterally spaced-apart main landing gears 106, lowered main wheels 133, and all three parts of the three-part cover structure for each main landing gear 106, to include inboard main landing gear cover or faring 107, outboard main landing gear cover or faring 108, and auxiliary main landing gear cover or faring 124. The wide stance of lowered main wheels 133 provide stable landing under adverse conditions, such as but not limited to landings on aircraft carriers (not shown).

Figure 11:
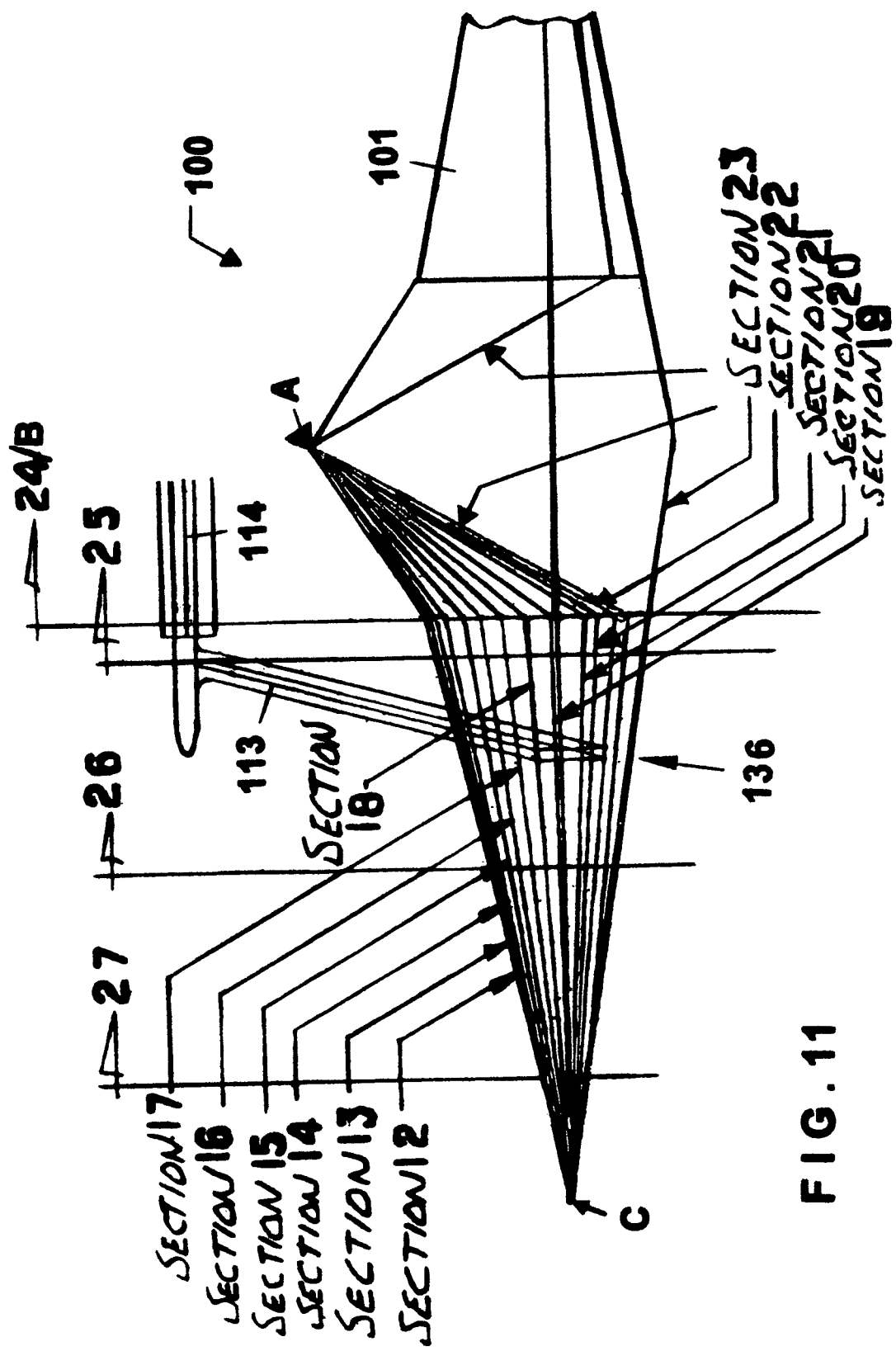
FIG. 11 is a rear view of the most preferred embodiment of the present invention with numbered cross-sections 12-27 shown relative to rudder assembly.

FIGS. 11-13 show various views of the numbered cross-sections not shown in the same detail in other illustrations. FIG. 11 shows a rear view of the most preferred embodiment of the present invention with numbered cross-sections on the port side of airframe 101 shown relative to the rudder assembly formed from vertical stabilizer 113 and elevator 114. Sections 12-23 are included, as well as airfoil Sections 24-27. The alphabetical designations of A, B, and C are also shown in FIG. 11, which respectively identify the centerline of the top surface of airframe 101 and extends substantially from Section line 1 to Section line 23, the break line (the same line marked with the designation of Section line 24) of airframe 101 where rocket mounting is contemplated which extends substantially from Section line 5 to Section line 23, and the side/perimeter edge of airframe 101 which extends substantially from Section line 5 to Section line 23. The vertically-extending Section lines 24-27 shown in FIG. 11 are approximately parallel to one another and extend longitudinally relative to airframe 101 (see also FIG. 9), with Section line 24 being the closest in location to centerline A and Section 27 being the closest in location to the side/perimeter edge C of airframe 101. The number 136 is also shown in FIG. 11 and represents the total dihedral bottom surface of airframe 101. FIG. 12 shows an enlarged rear view of numbered cross-sections 12-23 for additional clarity and reference, while FIG. 13 shows the numbered longitudinal sections 24-27 of the most preferred embodiment of the present invention shown in FIG. 10 superimposed upon one another to illustrate an airfoil design. Each Section 24-27 also has an acceleration profile 139 at its forward end, which provides air acceleration over its top surface 135 (identified in FIG. 6) and reduced air pressure to create greater lift.

I claim:

1. A strong, small, and compact stealth aircraft comprising:
    a rhomboid airframe with a dihedral bottom surface and an top surface designed as an airfoil, said top surface also having a front portion with an accelerator ramp and said dihedral bottom surface configured to cause a pressure differential under said airframe during take off and landings, and also provide greater pilot survivability during wheels-up emergency landings on hard runway surfaces and water;
    two tubes within said airframe, said tubes being stacked vertically one above the other within said airframe to create an upper tube and a lower tube, with said lower tube extending substantially the full length of said airframe and housing a nose landing gear and at least one engine;
    a plurality of main landing gears each housed for rotation to a storage position within said airframe;
    a canopy and a portion of said upper tube configured for providing a location to house a pilot;
    at least two flaps within said bottom surface configured for breaking said pressure differential under said airframe during take off and landings; and
    tail assembly means adapted to provide stabilization and control of said airframe during flight, whereas said rhomboid-dihedral structure of said airframe eliminates the need for a wing box providing reduced weight and reduced manufacturing cost, use of said tubes results in strong and light construction for said aircraft, and said tubes provide enhanced protection from ground fire.

2. The aircraft of claim 1 wherein said main landing gears have a wide stance.

3. The aircraft of claim 1 wherein said tubes comprises bulletproof material.

4. The aircraft of claim 1 wherein said dihedral configuration is adapted to provide radar deflecting stealth characteristics, emergency landings on water, and wheels-up emergency landings on hard runway surfaces.

5. The aircraft of claim 1 wherein said tubes are each approximately four feet in diameter, said airframe is approximately eighteen feet in width and approximately forty feet in length, and said airframe is configured to store a minimum of 2,444 gallons of fuel.

6. The aircraft of claim 1 wherein said at least one engine comprises a centered main engine and said tubes house items selected from a group consisting of a pilot, fuel tanks, machine guns and armament, miscellaneous equipment including radio gear, chafe, flotation gear, the air intake for said centered main engine, radar, nose wheels, jet engines, and a bomb storage area.

7. The aircraft of claim 6 wherein said machine guns and armament are located in said upper tube in front of said pilot, and said fuel tanks are located in said upper tube behind said pilot.

8. The aircraft of claim 6 wherein said upper tube does not extend longitudinally throughout said airframe and a storage area is located in said airframe behind said upper tube.

9. The aircraft of claim 8 wherein said storage area is configured for items selected from a group consisting of floatation gear, extra fuel, and chafe.

10. The aircraft of claim 1 wherein said tail assembly comprises two rudders that are each tipped inward a sufficient amount at the top for holding altitude in a flat turn.

11. The aircraft of claim 1 wherein said dihedral bottom surface of said airframe has a rear portion, and further comprising at least one wheel on said rear portion that is configured for tail skid.

12. The aircraft of claim 1 wherein said accelerator ramp is positioned on said top surface rearward from a pilot and said front portion of said airframe is configured to provide the pilot with good rearward and downward observation.

13. The aircraft of claim 1 wherein all of said top surface is configured for providing increased lift for said airframe.

14. The aircraft of claim 13 wherein lift provided by said top surface allows for take off of said aircraft from short runways.

15. The aircraft of claim 1 wherein said airframe and said tubes are configured for a large bomb capacity without use of hard points.

16. The aircraft of claim 1 wherein said airframe has a break line and is configured for rocket mounting on said top surface of said airframe along said break line.

17. The aircraft of claim 1 wherein said tail assembly further comprises an elevator.

18. The aircraft of claim 1 wherein said airframe has side edges and vortex spoiler means on said side edges.

19. The aircraft of claim 1 wherein said airframe has trailing edges and vortex spoiler means on said trailing edges.

20. The aircraft of claim 1 wherein said airframe has trailing and side edges and vortex spoiler means on said trailing and side edges.

* * * * *